United States Patent
Patwardhan et al.

(10) Patent No.: US 10,963,348 B1
(45) Date of Patent: Mar. 30, 2021

(54) SUMMARY CHANGE LOG INDEXED BY INODE NUMBERS

(71) Applicant: EMC IP Holding Company LLC, Hopkinton, MA (US)

(72) Inventors: Kedar Shrikrishna Patwardhan, Pune (IN); Navneet Upadhyay, Ghaziabad (IN); Venkatraman Venkatasubramanyam, Chennai (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 1180 days.

(21) Appl. No.: 14/576,899

(22) Filed: Dec. 19, 2014

(51) Int. Cl.
*G06F 16/00* (2019.01)
*G06F 11/14* (2006.01)

(52) U.S. Cl.
CPC ...... *G06F 11/1451* (2013.01); *G06F 11/1474* (2013.01); *G06F 2201/80* (2013.01); *G06F 2201/87* (2013.01)

(58) Field of Classification Search
CPC .................................. G06F 17/30; G06F 16/30
USPC ........................................................ 707/648
See application file for complete search history.

(56) References Cited

U.S. PATENT DOCUMENTS

| | | | | |
|---|---|---|---|---|
| 5,689,706 A | * | 11/1997 | Rao | G06F 9/52 |
| 5,909,540 A | * | 6/1999 | Carter | G06F 9/5016 |
| | | | | 707/E17.12 |
| 2003/0182313 A1 | * | 9/2003 | Federwisch | G06F 11/2066 |
| 2004/0111557 A1 | * | 6/2004 | Nakatani | G06F 11/1435 |
| | | | | 711/113 |
| 2011/0153567 A1 | * | 6/2011 | Sawdon | G06F 11/1451 |
| | | | | 707/645 |
| 2014/0298326 A1 | * | 10/2014 | Venkatesan | G06F 3/0608 |
| | | | | 718/1 |

* cited by examiner

*Primary Examiner* — Anhtai V Tran
(74) *Attorney, Agent, or Firm* — Krishnendu Gupta; Nikhil Patel (57) ABSTRACT

A summary change log indexed by inode number is disclosed. An indication is received that a file system object associated with a corresponding file system index node (inode) has been modified. A summary change record is stored for the corresponding inode, including by: locating or creating an entry for the inode in an inode translation file; storing data associated with the modification in a summary change record located within a summary change file at an offset indicated in the entry; and using the summary change record to perform a backup.

23 Claims, 6 Drawing Sheets

SUMMARY CHANGE LOG INDEXED BY INODE NUMBERS

BACKGROUND OF THE INVENTION

Certain backup solutions track modifications to files and for each modification stores a summary of the changes in one or more change logs. In one approach, change records are indexed by inode numbers. A bitmap may be used to keep track of which inode number that has been modified and has a record in the summary change log.

A summary file change log that uses an inode bitmap to keep track of summary change records works for inode numbers that have good locality (i.e., inode numbers associated with changes are not scattered throughout the inode number space) and when the inode numbers are less than 32-bits. However, modern file systems have started using truly 64-bit or 128-bit inode numbers that may or may not have locality. The bitmap file that would be required for a 64-bit inode number space, for example, would be of the size 2^61, which would have to be read in its entirety to determine all the inodes that had been modified. This can be very time consuming at the time of backup. Further, the inode summary change log and inode bitmap log also may become quite large and inefficient in terms of disk space usage since the file system often ends up allocating one logical storage block for each inode number that has been modified.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Systems and processes that use a summary change log structure and format that allows changes to be tracked and stored efficiently are disclosed. In various embodiments, a translation file is used to keep track of the existence and location of inode change records. Existing change records are used, if already present for an inode number affected by a modification, and new records, if needed, are appended to a file in which change records are stored. Modifications and file names are stored in separate files to enable change records of a fixed length to be used. At back up time, change records are read sequentially to back up modified portions of files associated with the records.

Figure 1:
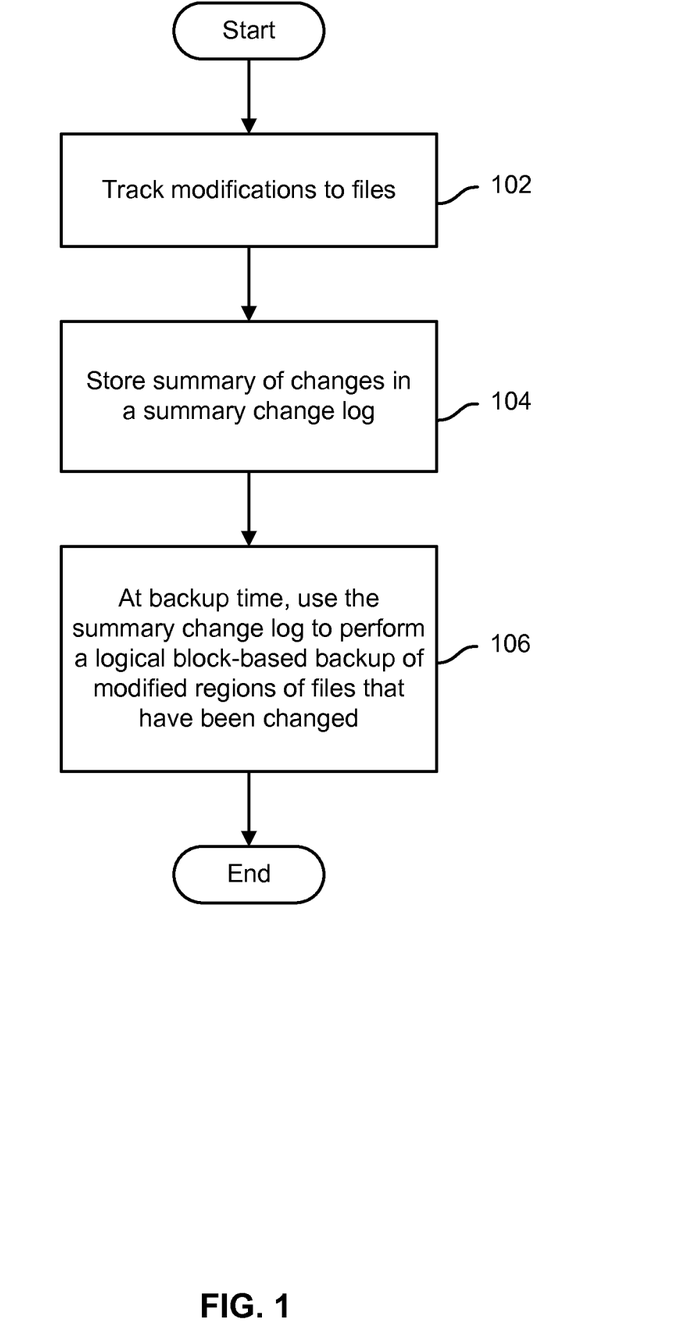
FIG. 1 is a flow chart illustrating an embodiment of a process to back up file data.

FIG. 1 is a flow chart illustrating an embodiment of a process to back up file data. In the example shown, modifications to files are tracked (102). A summary of each change is stored in a summary change log (104). At backup time, the summary change log is used to perform a logical block-based backup of blocks associated with portions of files that have been modified (106).

Figure 2A:
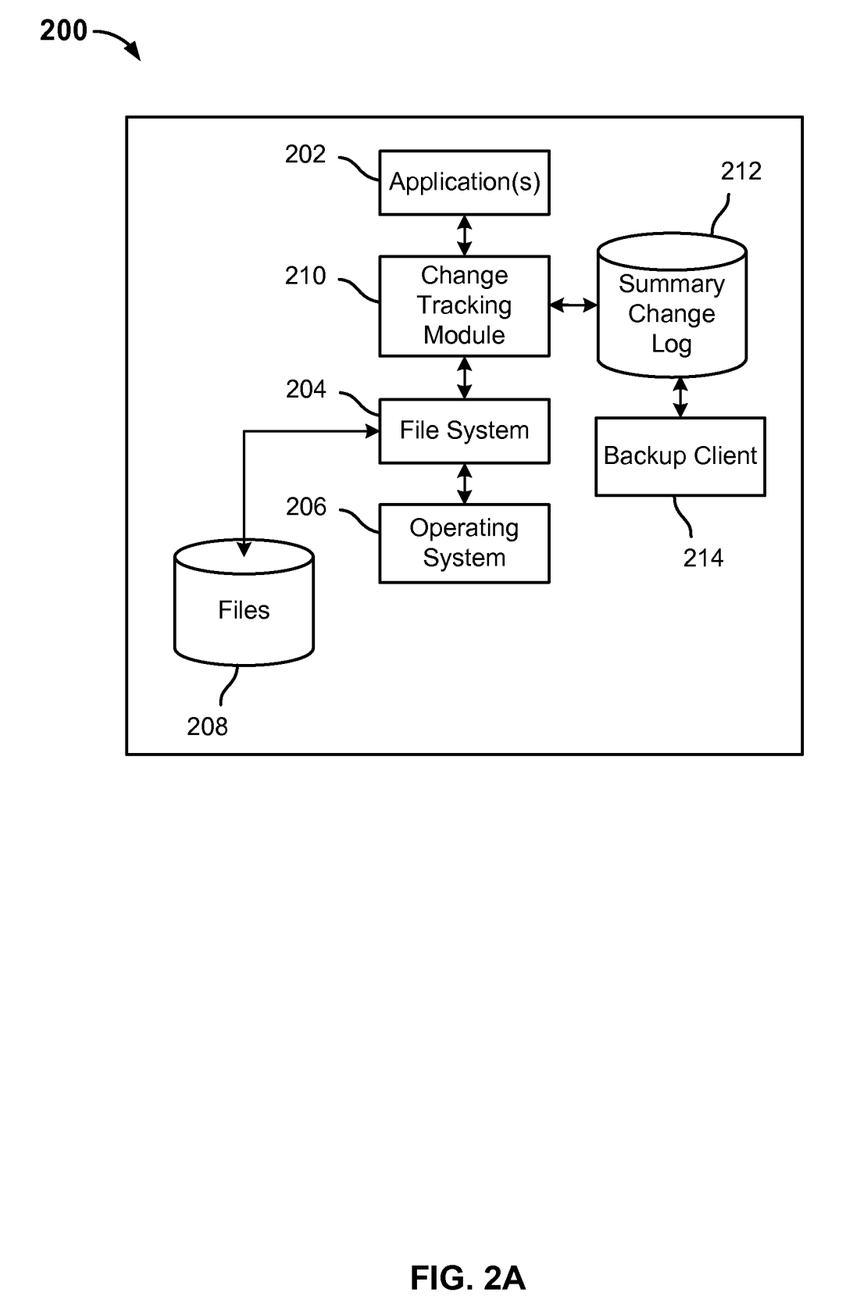
FIG. 2A is a block diagram illustrating an embodiment of a system to back up file data.

FIG. 2A is a block diagram illustrating an embodiment of a system to back up file data. In the example shown, system 200, e.g., a file server or other computer system, includes a processor (not shown) used to run one or more application(s) 202, which use a file system 204 associated with an operating system 206, both running on the processor, to store application files 208, e.g., on a disk drive or other storage device (not shown) comprising system 200. A change tracking module 210, e.g., a change block tracking driver, intercepts calls from the application(s) 202 to file system 204. If a call will result in changes to a file, associated change record data is generated by change tracking module 210 and stored in summary change log 212. In various embodiments, summary change log 212 may comprise one or more files in which fixed length summary change records are stored for each inode number that has been modified as a result of a file system call intercepted by change tracking module 210. Examples of such operations include, without limitation, operations by which a file was created, removed, modified, or renamed. A backup client 214 or other backup software uses the summary change log 212 at backup time to determine which files have been modified and to back up modified data associated with such changes.

Figure 2B:
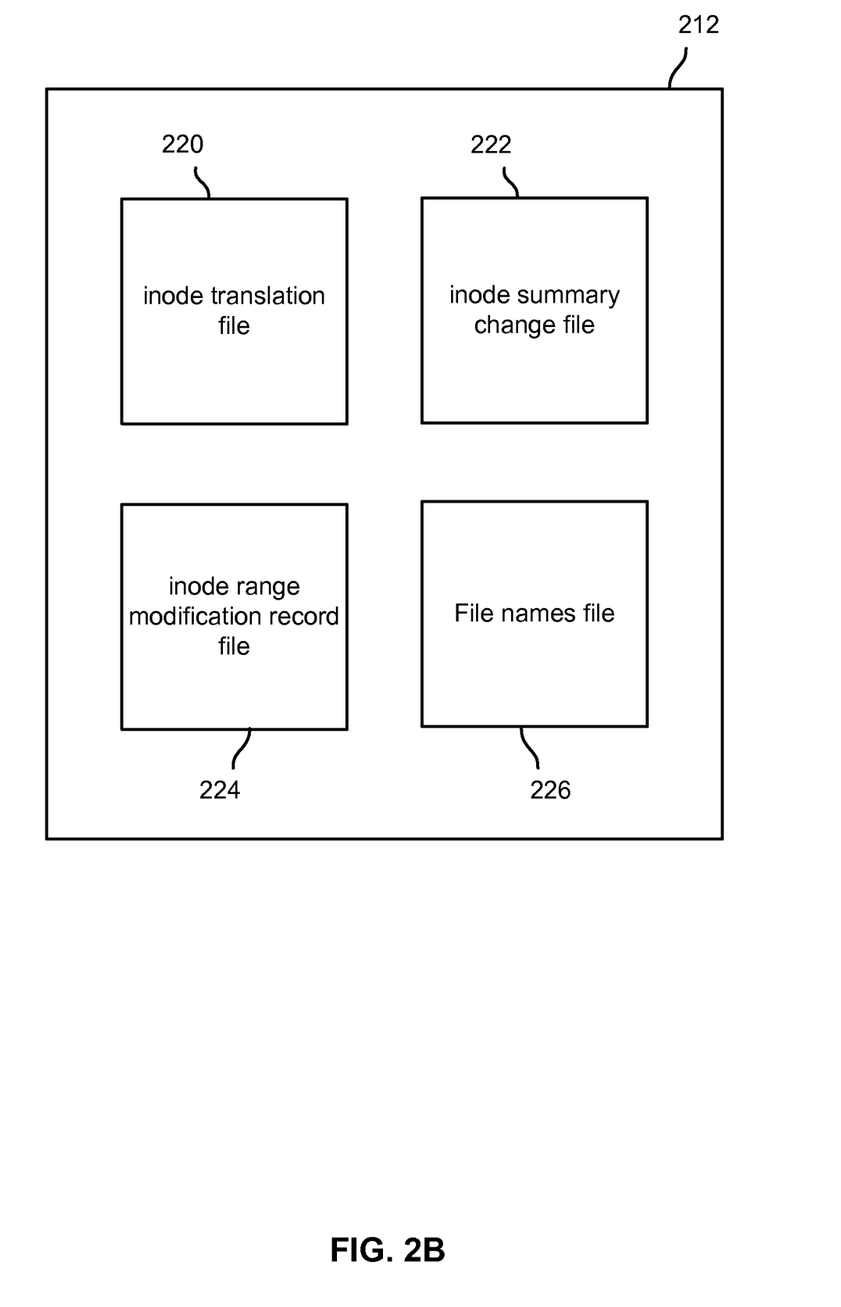
FIG. 2B is a block diagram illustrating an embodiment of a summary change log.

FIG. 2B is a block diagram illustrating an embodiment of a summary change log. In the example shown, summary change log 212 of FIG. 2A is shown to include four files: an inode translation file 220, an inode summary change file 222, an inode range modification record file 224, and a file names file 226. In various embodiments, inode translation file 220 is used to store for each inode that has been changed a location within inode summary change file 222 of a corresponding fixed-length change record for that inode. In some embodiments, hashes computed based at least in part on the respective inode numbers are used to store and/or find entries in inode translation file 220. In various embodiments, inode summary change file 222 includes for each inode that has been changed a corresponding fixed-length change record. New records are added by appending them to the end of the file, resulting in compact storage, and records are of the same fixed length, minimizing the size of the file. In various embodiments, summary change records included in inode summary change file 222 may point to further modification data stored in inode range modification record file 224. For example, a summary change record included in inode summary change file 222 may indicate an offset or range of offsets within inode range modification record file 224 at which corresponding modification data is stored. In various embodiments, file names file 226 contains a record having name(s) for a given inode and the offset of this record is updated in the summary change file record of that inode.

Figure 3:
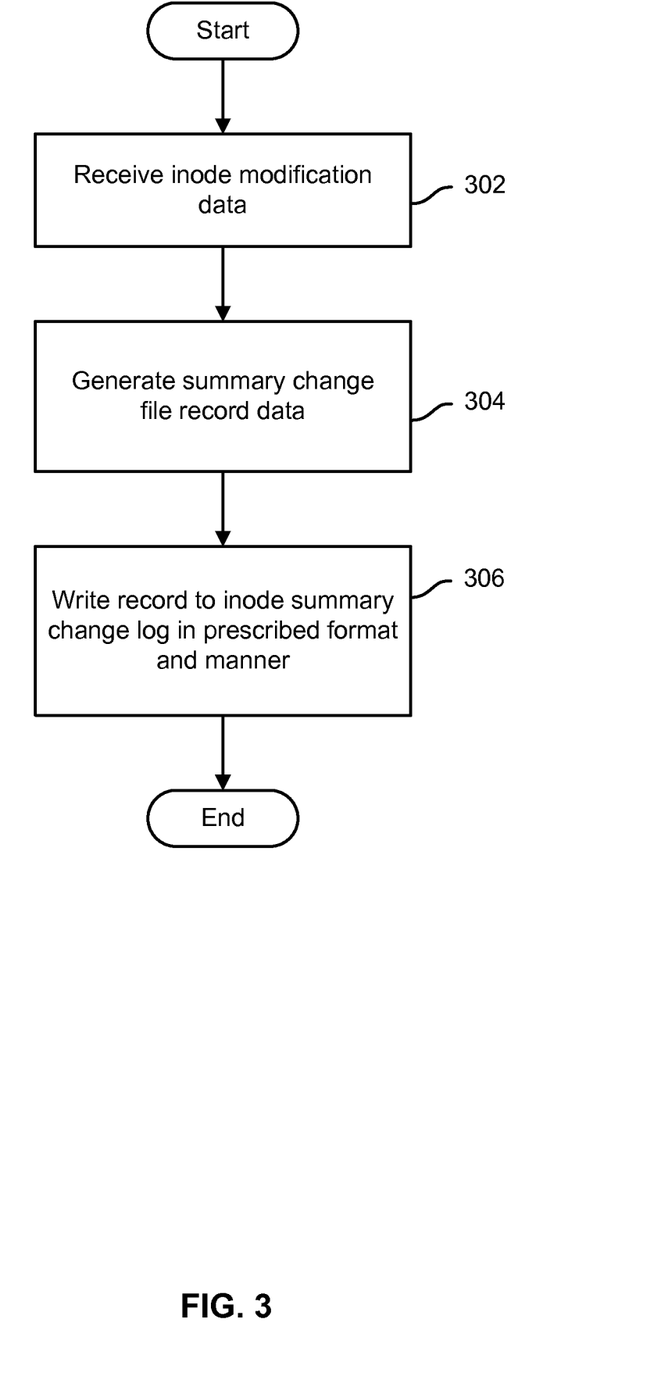
FIG. 3 is a flow chart illustrating an embodiment of a process to track changes to files.

FIG. 3 is a flow chart illustrating an embodiment of a process to track changes to files. In various embodiments, the process of FIG. 3 may be performed by a change tracking module, such as change tracking module 210 of FIG. 2A. In the example shown, inode modification data is received (302), e.g., from a kernel or other operating system and/or associated component. For each change, a summary change record data is generated (304) and written to an inode summary change log, such as summary change log 212 of FIGS. 2A and 2B (306).

Figure 4:
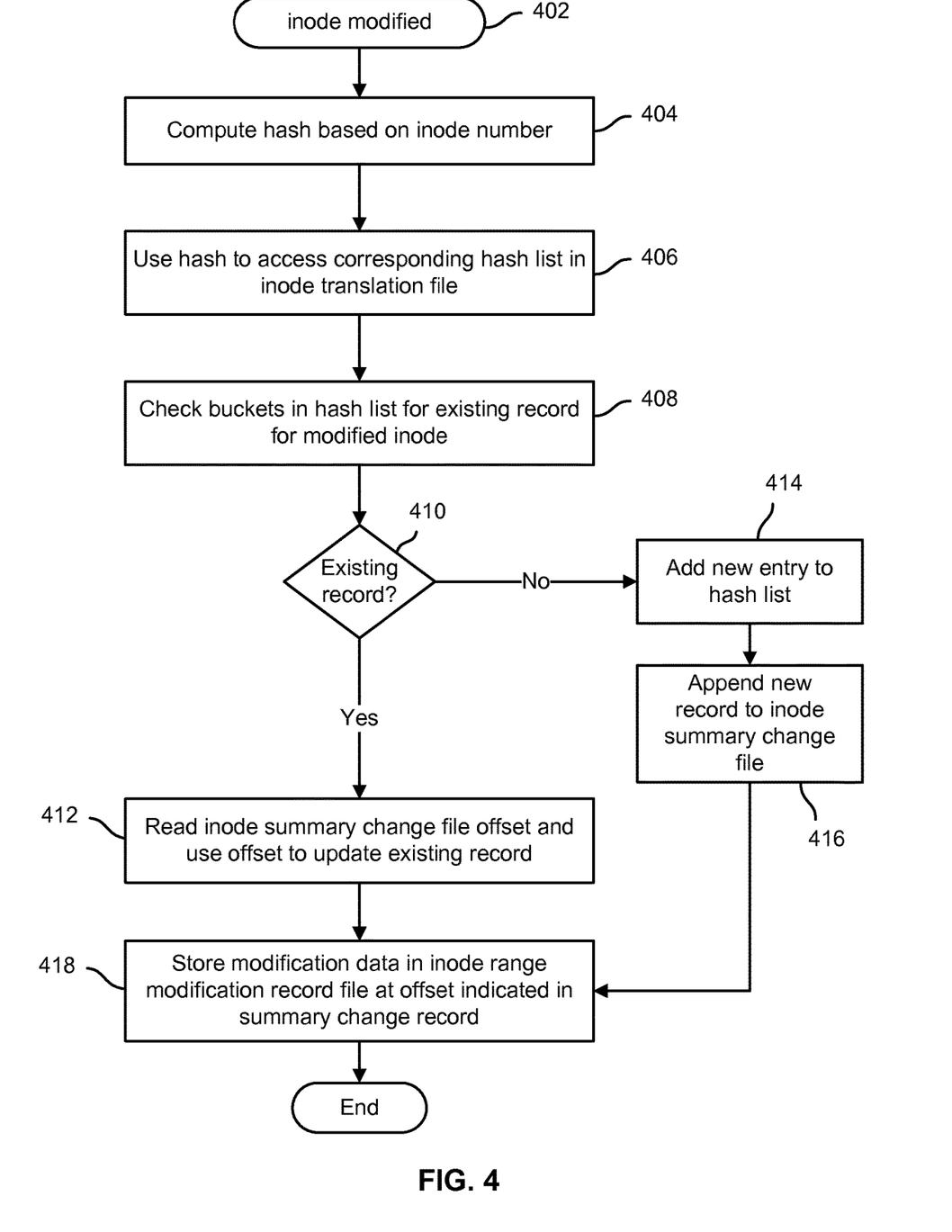
FIG. 4 is a flow chart illustrating an embodiment of a process to track file changes.

FIG. 4 is a flow chart illustrating an embodiment of a process to track file changes. In various embodiments, the process of FIG. 3 may be performed by a change tracking module, such as change tracking module 210 of FIG. 2A. In some embodiments, the process of FIG. 4 may be used to implement step 306 of the process of FIG. 3. In the example shown, for each inode modification is received (402) a hash is computed based at least in part on the inode number (404). The hash is used to access a corresponding hash list in an inode translation file (406), such as inode translation file 222 of FIG. 2B. A set of one or more buckets in the corresponding hash list are checked to determine whether any contains an existing entry for the modified inode (408). If an existing entry is found (410), the inode summary change file offset for the existing summary change record for the inode is read from the entry and the existing record is updated to reflect the modification currently being processed (412). If no existing record is found (410), a new entry for the inode is added to the hash list (414) and a new record for the inode is added (e.g., appended) to the inode summary change file (416). In either the updated summary change record (410, 412) or the newly-added summary change record (414, 416) an offset at which corresponding modification data is located within the inode range modification record file is included, and the corresponding modification data is stored in the inode range modification record file at that offset (418).

Processing as illustrated in FIG. 4, for example, in various embodiments enables relevant summary change records to be located and generated (if not already in existence) quickly. In addition, by storing one summary change record for each inode; having all summary change records be of the same fixed length; and having each record be of fixed length, the storage space required to store change records and the time and other resources required to scan through them are minimized.

Figure 5:
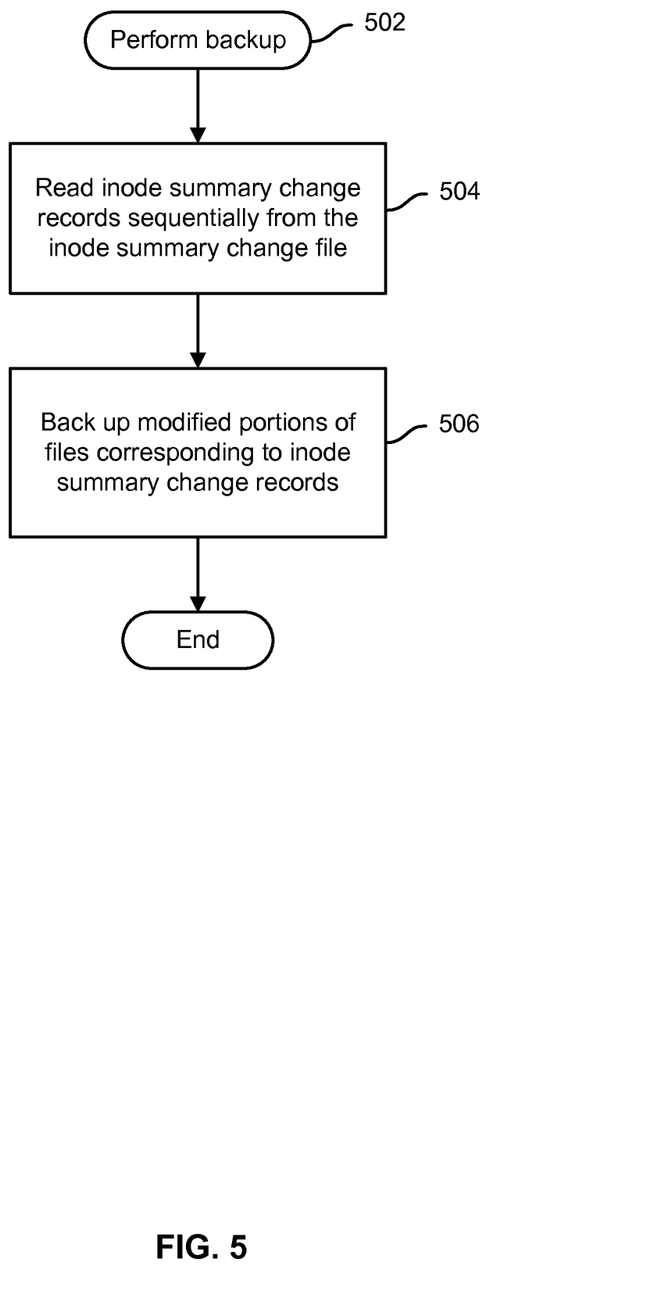
FIG. 5 is a flow chart illustrating an embodiment of a process to use a summary change log to back up data.

FIG. 5 is a flow chart illustrating an embodiment of a process to use a summary change log to back up data. In various embodiments, a summary change log structured as in the example shown in FIG. 2B and created as described above in connection with FIGS. 3 and 4 may be used. In some embodiments, the process of FIG. 5 may be implemented by a backup client or agent, such as backup client 214 of FIG. 2B. In the example shown, to perform a backup (502), inode summary change records are read sequentially from the inode summary change file, such as inode summary change file 224 of FIG. 2B (504). For each summary change record, modified data associated with that summary change record and the inode number with which the summary change record is associated is included in the backup (506). Detailed modification data may be read from a modification record in a modification record file, such as inode range modification record file 224 of FIG. 2B.

Techniques disclosed herein enable changes to be tracked efficiently and stored in a manner that uses storage space efficiently and enables backup operations to be performed efficiently.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of backing up data, comprising:
receiving an indication that a file system object associated with a corresponding file system index node (inode) has been modified, the indication being generated in connection with an interception of a call associated with the corresponding system object;
in response to receiving the indication that the file system object associated with the corresponding file system inode has been modified, storing for the corresponding inode a summary change record, the summary change record being stored among an inode translation file, an inode summary change file, and an inode range modification record file, and the storing the summary change record comprising:
determining whether the inode translation file comprises an entry for the inode, wherein the inode translation file tracks inodes for which corresponding inode change records exist and a location of the corresponding inode change records within the innode summary change record;
in response to determining that the inode translation file comprises the entry for the inode, locating the entry for the inode within the inode summary change record;
in response to determining that the inode translation file does not comprise the entry for the inode, creating the entry for the inode within the inode translation file; and
storing data associated with the modification in a summary change record located within the inode summary change file at an offset indicated in the entry for the inode within the inode summary record change record, wherein each summary change record located within the inode summary change file is a preset fixed length, and at least one entry within the inode summary change file points to corresponding modification data stored in the inode range modification record file; and
using the summary change record to perform a backup.

2. The method of claim 1, wherein the indication that the file system object has been modified is received from an operating system kernel of an operating system with which the file system object is associated.

3. The method of claim 1, wherein the locating the entry for the inode or the creating an entry for the inode in the inode translation file includes computing a hash based at least in part on an inode number of the inode; and using the hash to determine whether an existing entry for the inode is present in the inode translation file.

4. The method of claim 1, wherein the summary change record included data indicating a location of corresponding modification data within the inode range modification record file.

5. The method of claim 1, wherein using the summary change record to perform a backup includes reading records comprising the inode summary change file sequentially and for each record including corresponding data in the backup.

6. The method of claim 1, wherein modification of the file system object is tracked using the inode translation file, the summary change file, and the inode range modification record file, the inode range modification record file comprising modification data at an offset identified in the summary change file.

7. The method of claim 1, using the summary change record to perform the backup comprises sequentially reading inode summary change records from the inode summary change file and backing up modification data stored in the inode range modification record file at an offset indicated at the corresponding inode summary change record.

8. The method of claim 1, wherein the creating the entry for the inode within the inode translation file comprises appending the entry for the inode to an end of the inode translation file.

9. The method of claim 1, wherein in the event that the inode translation file is determined to comprise the entry for the inode, the storing the data associated with the modification comprises updating the corresponding inode change records within the innode summary change record.

10. The method of claim 3, wherein determining whether an existing entry for the inode is present in the inode translation file includes using the computed hash to find a corresponding hash list within the inode translation file and checking whether an existing entry for the inode is present in the hash list.

11. The method of claim 3, further comprising creating an entry for the inode in the inode translation file in response to a determination that an existing entry is not present.

12. The method of claim 4, wherein the data indicating a location of corresponding modification data within the inode range modification record file comprises an offset.

13. The method of claim 5, wherein the backup comprises a block-based backup and reading records comprising the inode summary change file sequentially and for each record including corresponding data in the backup comprises including in the backup for each record a set of blocks indicated by the record as having been modified.

14. The method of claim 11, wherein creating an entry for the inode in the inode translation file includes adding a summary change record for the inode to the inode summary change file and storing the offset in the created entry.

15. The method of claim 14, wherein the summary change record is added to the inode summary change file by appending the summary change record at an end of the inode summary change file.

16. A system to back up data, comprising:
a storage device; and
a processor coupled to the storage device and configured to:
receive an indication that a file system object associated with a corresponding file system index node (inode) has been modified, the indication being generated in connection with an interception of a call associated with the corresponding system object;
in response to receiving the indication that the file system object associated with the corresponding file system inode has been modified, store for the corresponding inode, in the storage device, a summary change record, the summary change record being stored among an inode translation file, an inode summary change file, and an inode range modification record file, and to store the summary change record comprises:
determining whether the inode translation file comprises an entry for the inode, wherein the inode translation file tracks inodes for which corresponding inode change records exist and a location of the corresponding inode change records within the innode summary change record;
in response to determining that the inode translation file comprises the entry for the inode, locating the entry for the inode within the inode summary change record;
in response to determining that the inode translation file does not comprise the entry for the inode, creating the entry for the inode within the inode translation file; and
storing data associated with the modification in a summary change record located within the inode summary change file at an offset indicated in the entry for the inode within the inode summary record change record, wherein each summary change record located within the inode summary change file is a preset fixed length, and at least one entry within the inode summary change file points to corresponding modification data stored in the inode range modification record file; and
use the summary change record to perform a backup.

17. The system of claim 16, wherein the indication that the file system object has been modified is received from an operating system kernel of an operating system with which the file system object is associated.

18. The system of claim 16, wherein the locating the entry for the inode or the creating an entry for the inode in the inode translation file includes computing a hash based at least in part on an inode number of the inode; and using the hash to determine whether an existing entry for the inode is present in the inode translation file.

19. The system of claim 18, wherein determining whether an existing entry for the inode is present in the inode translation file includes using the computed hash to find a corresponding hash list within the inode translation file and checking whether an existing entry for the inode is present in the hash list.

20. The system of claim 18, wherein the processor is further configured to create an entry for the inode in the inode translation file in response to a determination that an existing entry is not present.

21. The system of claim 20, wherein creating an entry for the inode in the inode translation file includes adding a summary change record for the inode to the inode summary change file and storing the offset in the created entry.

22. The system of claim 21, wherein the summary change record is added to the inode summary change file by appending the summary change record at an end of the inode summary change file.

23. A computer program product to back up data, the computer program product being embodied in a non-transitory computer readable storage medium and comprising computer instructions for:

receiving an indication that a file system object associated with a corresponding file system index node (inode) has been modified, the indication being generated in connection with an interception of a call associated with the corresponding system object;

in response to receiving the indication that the file system object associated with the corresponding file system inode has been modified, storing for the corresponding inode a summary change record, the summary change record being stored among an inode translation file, an inode summary change file, and an inode range modification record file, and the storing the summary change record comprising:

determining whether the inode translation file comprises an entry for the inode wherein the inode translation file tracks inodes for which corresponding inode change records exist and a location of the corresponding inode change records within the innode summary change record;

in response to determining that the inode translation file comprises the entry for the inode, locating the entry for the inode within the inode summary change record;

in response to determining that the inode translation file does not comprise the entry for the inode, creating the entry for the inode within the inode translation file; and storing data associated with the modification in a summary change record located within the inode summary change file at an offset indicated in the entry for the inode within the inode summary record change record, wherein each summary change record located within the inode summary change file is a preset fixed length, and at least one entry within the inode summary change file points to corresponding modification data stored in the inode range modification record file; and using the summary change record to perform a backup.

* * * * *